United States Patent [19]

Iijima et al.

[11] 4,450,897

[45] May 29, 1984

[54] AIR-CONDITIONING METHOD AND SYSTEM FOR AN AUTOMOTIVE VEHICLE

[75] Inventors: Tetsuya Iijima, Yamato; Seiichi Takahashi, Tokyo, both of Japan

[73] Assignee: Nissan Motor Company, Limited, Kanagawa, Japan

[21] Appl. No.: 317,861

[22] Filed: Nov. 3, 1981

[30] Foreign Application Priority Data

Nov. 4, 1980 [JP] Japan ................................ 55-153717

[51] Int. Cl.³ ...................... G05D 23/00; B60H 3/00; F25B 29/00
[52] U.S. Cl. ......................................... 165/2; 165/12; 165/16; 165/28; 165/43; 236/13; 236/91 D; 236/91 E; 236/49
[58] Field of Search .................. 165/12, 2, 14, 16, 25, 165/43, 42, 28, 30; 236/49, 91 D, 91 E, 91 G, 13; 237/5, 12.3 B

[56] References Cited

U.S. PATENT DOCUMENTS

| | | |
|---|---|---|
| 4,223,720 | 9/1980 | Poirier d'Ange d'Orsay et al. . |
| 4,291,749 | 9/1981 | Ootsuka et al. ........................ 165/43 |
| 4,311,188 | 1/1982 | Kojima et al. .......................... 165/2 |
| 4,316,251 | 2/1982 | Saito et al. ............................. 165/42 |
| 4,323,111 | 4/1982 | Iijima .................................... 165/28 |
| 4,325,426 | 4/1982 | Otsuka et al. ......................... 165/30 |
| 4,328,855 | 5/1982 | Iwata et al. ............................ 165/2 |
| 4,337,821 | 7/1982 | Saito ..................................... 165/28 |
| 4,340,113 | 7/1982 | Iwata et al. ........................... 165/25 |

FOREIGN PATENT DOCUMENTS

| | | |
|---|---|---|
| 7775 | 2/1980 | European Pat. Off. . |
| 32735 | 7/1981 | European Pat. Off. . |
| 2939954 | 4/1980 | Fed. Rep. of Germany . |
| 3029148 | 2/1981 | Fed. Rep. of Germany . |
| 7711483 | 11/1978 | France . |
| 55-1215 | 1/1980 | Japan ..................................... 165/42 |

*Primary Examiner*—William R. Cline
*Assistant Examiner*—John K. Ford
*Attorney, Agent, or Firm*—Lowe, King, Price & Becker

[57] ABSTRACT

An air-conditioning method and system controls the temperature of air outputted from an air conditioner outlet duct into the passenger compartment of a vehicle at a constant level, with a small time constant of recovery, by adjusting the air mix door opening percentage. The air-conditioning method comprises the steps of calculating a target outlet duct air temperature on the basis of a preset passenger compartment air temperature, a detected outside-air temperature, and a detected passenger compartment air temperature in accordance with a heat equilibrium equation and calculating an air mix door opening percentage on the basis of the calculated target outlet duct air temperature in accordance with a linear interpolation between two endpoints of a selected one of three characteristics representative of relationships between outlet duct air temperature and air mix door opening percentage respectively stored for outside-air introduction mode, inside-air recirculation mode, and cooler compressor operation mode.

12 Claims, 8 Drawing Figures

(C) COOLER COMPRESSOR OPERATION (B) INSIDE-AIR RECIRCULATION (A) OUTSIDE-AIR INTRODUCTION

AIR-CONDITIONING METHOD AND SYSTEM FOR AN AUTOMOTIVE VEHICLE

BACKGROUND OF THE INVENTION

1. Field of the Invention

The present invention relates to an air-conditioning method and system used for an automotive vehicle, and more specifically to the air-conditioning method and system in which temperature within the passenger compartment can be controlled at a preset temperature with a small time constant of temperature recovery in any of various air-introduction modes such as outside-air introduction mode, inside-air recirculation mode and cooler compressor operation mode.

2. Description of the Prior Art

Recently, an automotive vehicle has been provided with an air conditioner which can maintain air temperature within the passenger compartment at an appropriate temperature condition.

In a prior-art air-conditioning system, air is introduced through an air intake duct by a blower fan and is cooled by a cooling unit. After being cooled, one part of the introduced air is heated by a heating unit and is proportioned with the other unheated part of the introduced air by an air mix door in order to maintain the air within the passenger compartment in a desired temperature. Further, in this case, an air intake door is usually provided in order to effect the outside-air introduction mode or inside-air recirculation mode. The outside-air introduction mode is used for refreshing the air within the passenger compartment with fresh air and the inside-air recirculation mode is used for cooling or heating the air within the passenger compartment efficiently.

In the air-conditioner as described above, the air mix door is opened or closed by an air mix door actuator, which is controlled by two solenoid valves. The solenoid valves are energized by using a bridge circuit including various resistors of a passenger compartment air temperature sensor, an outside-air temperature sensor, an air mix door opening percentage sensor, a passenger compartment air temperature presetting variable resistor, fixed resistors, etc.

In such a prior-art air conditioning system thus constructed, however, since temperature of air introduced through the air intake duct into the air conditioning system changes according to whether outside-air introduction mode or inside-air recirculation mode is employed, the temperature of air outputted from the air outlet duct into the passenger compartment also changes. Moreover, even if the inlet duct air temperature is constant, the outlet-duct air temperature changes depending upon whether the compressor is in operation or not, because the introduced air is cooled when passing through the cooling unit. Therefore, it is difficult to efficiently control the temperature of air outputted from the air outlet duct into the passenger compartment at a preset constant temperature with a small time constant of temperature recovery.

A more detailed description of the prior-art air conditioning system will be made hereinafter with reference to the attached drawings under DETAILED DESCRIPTION OF THE PREFERRED EMBODIMENTS.

SUMMARY OF THE INVENTION

With these problems in mind therefore, it is the primary object of the present invention to provide an air-conditioning method and a system for controlling the temperature of air outputted from the air conditioner outlet duct into the passenger compartment at a constant level with a small time constant of temperature recovery in any of various air introduction modes, that is, even when the air conditioning system is operating in outside-air introduction mode, inside-air recirculation mode or cooler compressor operation mode.

To achieve the above mentioned objects, the air-conditioning method of controlling the temperature of air outputted from the air conditioner outlet duct into the passenger compartment at a constant level with a small time constant of temperature recovery according to the present invention includes steps by which a target outlet duct air temperature is calculated on the basis of a preset passenger compartment air temperature, the detected outside-air temperature, and the detected passenger compartment air temperature in accordance with a heat equilibrium equation, followed by calculation of the opening percentage of an air mix door according to the calculated target outlet duct air temperature in accordance with a proportion equation in each of the outside-air introduction mode, inside-air recirculation mode, and cooler compressor operation mode, respectively, and lastly the air mix door opening percentage thus calculated is compared with the one detected by an air mix door opening percentage sensor to control the air mix door opening percentage at an appropriate value.

To achieve the above mentioned objects, the air-conditioning system for controlling the temperature of air outputted from the air conditioner outlet duct into the passenger compartment at a constant level with a small time constant of temperature recovery according to the present invention comprises various sensors, such as an outside-air temperature sensor, a passenger compartment air temperature sensor and an air mix door opening percentage sensor, a passenger compartment air temperature preset device, a cooler compressor actuating switch, an air intake door switch, and an arithmetic control unit including a target outlet duct air temperature calculating unit with a memory unit, an air mix door opening percentage calculating unit with a memory unit and a comparator, etc. This arithmetic control can be replaced by a microcomputer including a CPU, a ROM, a RAM, a clock signal generator, etc.

BRIEF DESCRIPTION OF THE DRAWINGS

The features and advantages of the air-conditioning method and system for controlling the temperature of air outputted from the air conditioner outlet duct into the passenger compartment at a constant level with a small time constant of temperature recovery according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

To facilitate understanding of the present invention, a brief reference will be made to a prior-art air-conditioning system with reference to the attached drawings.

Figure 1:
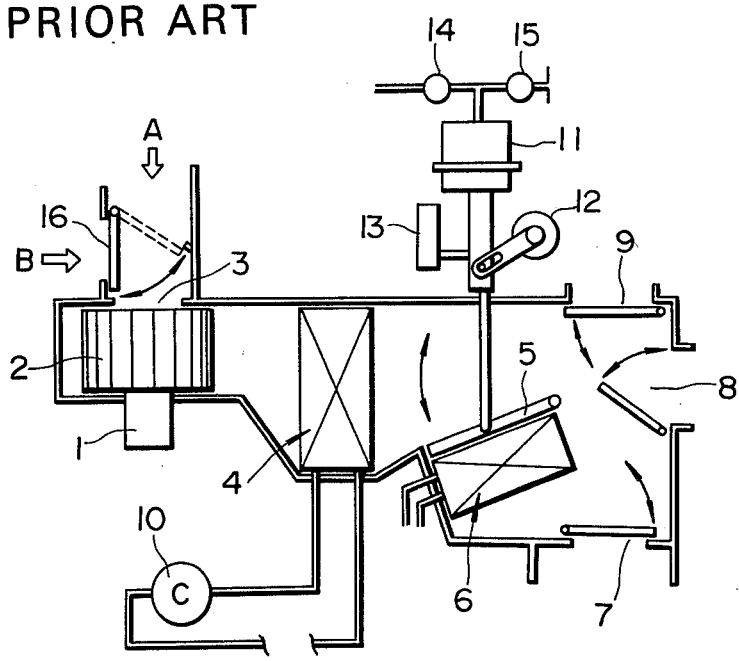
FIG. 1 is a diagramic illustration of a prior-art air conditioning system.

FIG. 1 shows a diagrammatical illustration of a sample prior-art air-conditioning system. In this system, air is drawn in through an air intake duct 3 by a blower fan 2 driven by a motor 1 and is cooled by a cooling unit 4. After being cooled, one part of the introduced air is heated by a heating unit 6 and is next mixed with the other unheated part of introduced air according to the opening percentage of an air mix door 5, and lastly outputted from a number of air outlet ducts 7, 8, and 9 into the passenger compartment. The reference numeral 10 denotes a compressor, the numeral 11 denotes an actuator for positioning the air mix door 5, the numeral 12 denotes a sensor for detecting the opening percentage of the air mix door, the numeral 13 denotes a slide switch linked to the air mix door, the numerals 14 and 15 denote solenoid valves to activate the actuator 11; that is, the numeral 14 denotes a solenoid valve to introduce a vacuum pressure in the engine intake manifold into the actuator 11 to change the air mix door opening percentage in one direction, and the numeral 15 denotes a solenoid valve to release the pressure of the actuator 11 to atmospheric pressure to change the air mix door opening percentage in the opposite direction. The air drawn in by the blower fan 2 is directed by an air intake door 16. In the case where the door 16 is located as shown by the solid lines in FIG. 1, only outside air is introduced into the blower fan 2 as shown by the arrow A in FIG. 1. In this case, the air within the passenger compartment is refreshed with fresh air, which is called outside-air introduction mode. In the case where the door 16 is located as shown by the dashed lines in FIG. 1, only inside air is introduced into the blower fan 2 as shown by the arrow B in FIG. 1. In this case, the air recirculated from within the passenger compartment is efficiently cooled or heated, which is called inside-air recirculation mode.

Figure 2:
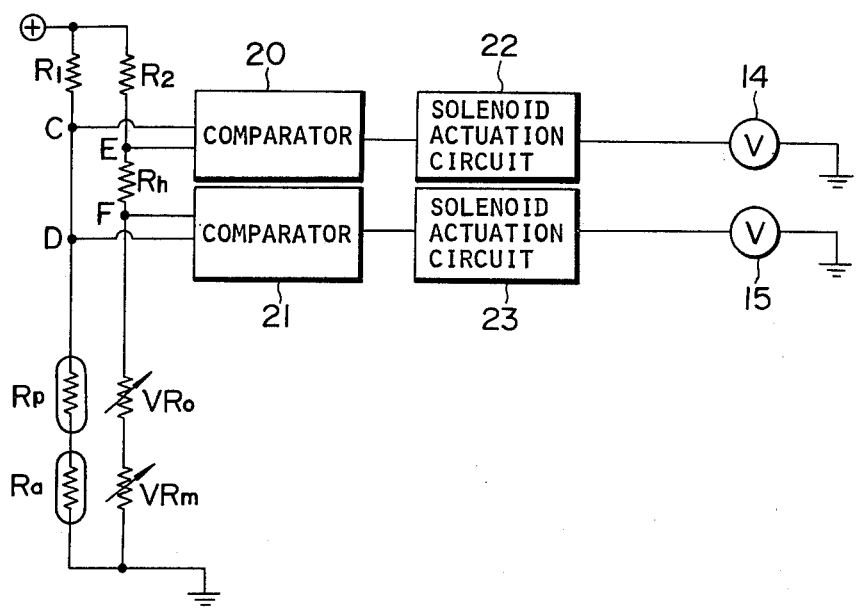
FIG. 2 is a schematic block diagram of a controller used with the prior-art air conditioning system.

The above-mentioned air conditioning system is conventionally controlled by a bridge circuit as shown in FIG. 2. The bridge circuit comprises a passenger compartment air temperature sensor $R_p$, an outside-air temperature sensor $R_a$, a first fixed resistor $R_1$, a second fixed resistor $R_2$, a passenger compartment air temperature presetting variable resistor $VR_o$, a variable resistor $VR_m$ used for the air mix door opening percentage sensor, and a fixed resistor $R_h$ across which an output voltage is taken out.

Pairs of connection points C and E, and D and F are connected to two comparators 20 and 21 respectively. When a potential difference is generated between the connection points C and E, the solenoid valve 14 is actuated by a solenoid valve actuation circuit 22, so that vacuum pressure is introduced into the actuator 11 of FIG. 1. On the other hand, when a potential difference is generated between the connection points D and F, the solenoid valve 15 is actuated by a solenoid valve actuation circuit 23, so that vacuum pressure is relieved from the actuator 11 of FIG. 1. In response to the movement of the actuator 11, the opening percentage of the air mix door 5 is adjusted.

In such a prior-art air conditioning system thus constructed, however, since the temperature of introduced air depends upon whether the air is introduced in outside-air introduction mode or in inside-air recirculation mode, the temperature of air outputted from the outlet duct into the passenger compartment varies. Moreover, even if the introduced-air temperature is constant, the temperature of air outputted from the outlet duct into the passenger compartment depends upon whether the compressor is operating or not, because the introduced air is cooled while passing through the cooling unit. Hereinafter, outside-air introduction mode, inside-air recirculation mode, and cooler compressor operation mode are called air introduction conditions.

In order to reduce the change in temperature of the air outputted from the outlet duct into the passenger compartment, a method has been proposed such that resistors are connected in series or in parallel with the passenger compartment air temperature sensor $R_p$ to detect the temperature within the passenger compartment and the outside-air temperature sensor $R_a$ to detect the temperature of outside air provided in the abovementioned bridge circuit, and these resistors are connected or disconnected in accordance with the ON-OFF condition of the compressor, in order to improve the temperature control characteristics of the bridge circuit.

It is also possible to consider applying the same method to the cases of outside-air introduction mode and inside-air recirculation mode; that is, the method of providing respective independent bridge circuits for the above two modes so as to switch the resistors having the same functions as described above in order to improve the temperature control characteristics of the respective independent bridge circuits. In this method, however, even if it is possible to change the temperature control characteristics according to the air introduction conditions, since the linearity with respect to temperature of the elements used for the bridge circuits, such as thermistors, is not absolute, there inevitably exists a limit of accuracy in the prior-art air conditioning system which uses bridge circuits, that is, it is very difficult to always maintain the temperature of air outputted from the outlet duct into the passenger compartment at a constant level.

Now follows a description of the present invention with reference to the attached drawings.

First, heat quantity equilibrium is explained hereinbelow, which is the basic concept of the present invention.

In order to maintain the temperature within the passenger compartment, the heat quantity $Q_{AC}$ supplied by an air conditioning system must be equal to the thermal load applied to the vehicle (solar heat, outside air, ventilation, passengers' body heat, engine, etc.). Therefore, an equilibrium equation is obtained as follows:

$$Q_{AC} = Q_T + Q_V + Q_S - Q_M + Q_I \quad (1)$$

where $Q_T$ is the heat quantity absorbed into or radiated from the passenger compartment due to difference in temperature between outside air and inside air, $Q_V$ is the heat quantity introduced thereinto or discharged therefrom due to ventilation, $Q_S$ is the heat quantity absorbed thereinto as solar heat, $Q_M$ is the heat quantity radiated from passenger's body, and $Q_I$ is the heat quantity radiated from equipment within the vehicle, such as an engine. The above-mentioned heat quantity $Q_{AC}$ to be supplied to the passenger compartment is determined by the difference in temperature between air outputted from an air conditioning system $T_{AC}$ and air within a passenger compartment $T_P$. The thermal loads $Q_T$ and $Q_V$ are determined by the difference in temperature between outside air $T_A$ and inside, that is passenger compartment air $T_P$. The solar heat temperature $T_S$ is determined by incident solar energy. Accordingly, since $Q_M$ and $Q_I$ are roughly constant, it is also possible to express the above equation (1) as another temperature equilibrium equation as follows:

$$T_{AC} = aT_P + bT_A + cT_S + d \quad (2)$$

where $T_{AC}$ is the target temperature of air outputted from an air conditioning system, $T_P$ is the passenger compartment air temperature, $T_A$ is the outside-air temperature, $T_S$ is the expectable increase of passenger compartment temperature due to solar heat, and a, b, c and d are constants. Now, if the temperature of air outputted from the air conditioning system when a passenger compartment air temperature $T_P$ reaches a preset temperature $T_O$ is considered as a basic outlet duct air temperature $T_{ACO}$, the following equation can be obtained from Equation (2), because $T_P$ is $T_O$:

$$T_{ACO} = aT_O + bT_A + cT_S + d \quad (3)$$

By comparing equations (2) and (3), it is possible to obtain the target outlet duct air temperature $T_{AC}$ as follows:

$$T_{AC} = T_{ACO} + \Delta T \quad (4)$$
$$\alpha(T_O - T_P) = a(T_P - T_O)$$

where
$$\Delta T = \alpha(T_O - T_P) \quad (5)$$

That is to say, a target outlet duct air temperature $T_{AC}$ can be expressed as follows:

$$T_{AC} = aT_O + bT_A + cT_S + d + \alpha(T_O - T_P) \quad (6)$$

where $\alpha$ is a constant equal to $-a$.

In the air-conditioning method according to the present invention, the above-mentioned target outlet duct air temperature $T_{AC}$ is calculated in accordance with the above heat equilibrium equation 6. In this case, the preset passenger compartment air temperature $T_O$ is preset by a temperature presetting device, and the outside-air temperature $T_A$ and the passenger compartment air temperature $T_P$ are actually detected by respective temperature sensors. On the other hand, the passenger compartment air temperature $T_S$ due to solar heat and constants a, b, c, d and $\alpha$ are all fixed and previously stored in an appropriate memory unit.

Figure 3A:
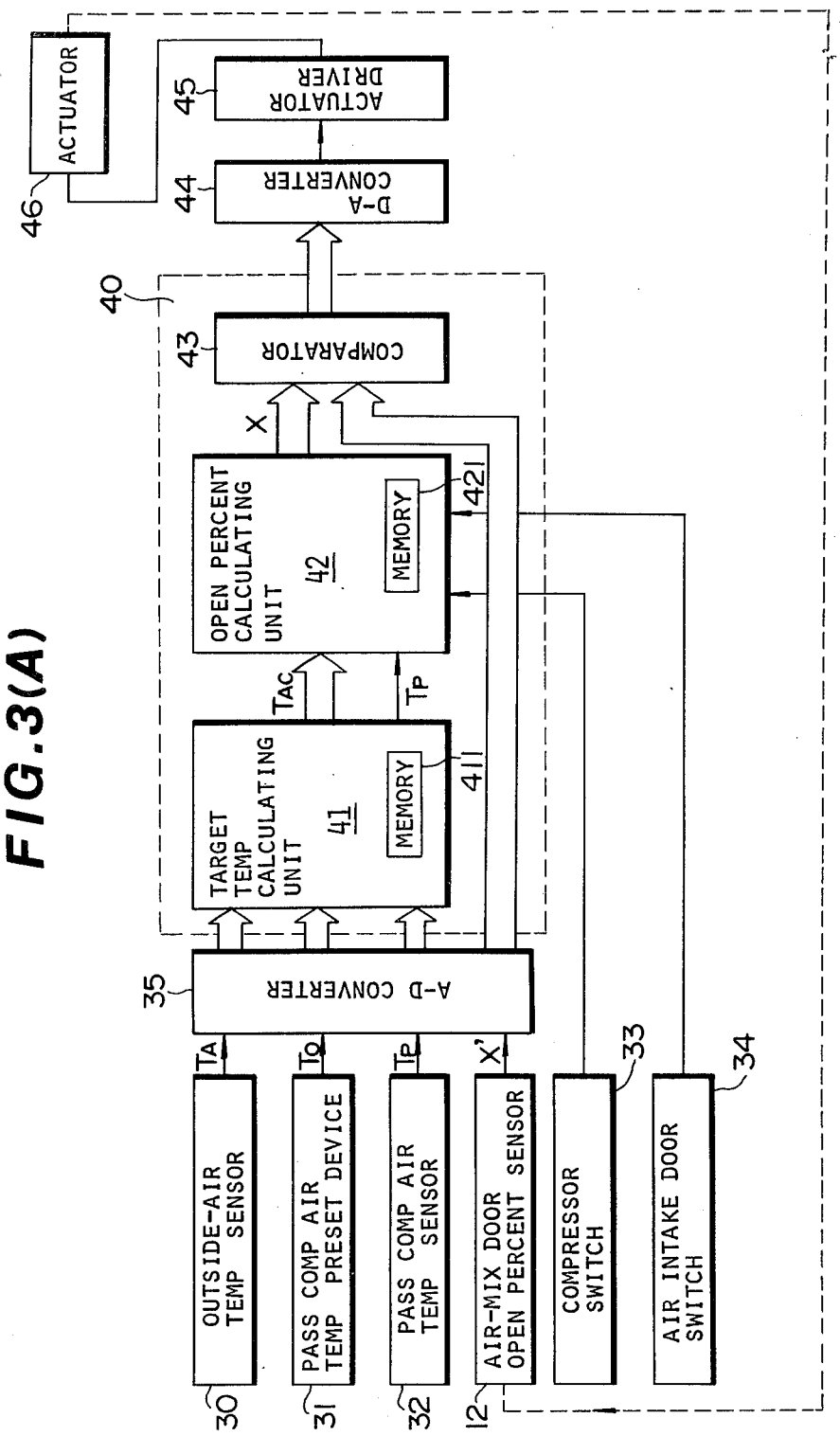
FIG. 3(A) is a schematic block diagram of a first embodiment of the air-conditioning system for controlling the temperature of air outputted from the air conditioner outlet duct into the passenger compartment at a constant level according to the present invention.
Figure 3B:
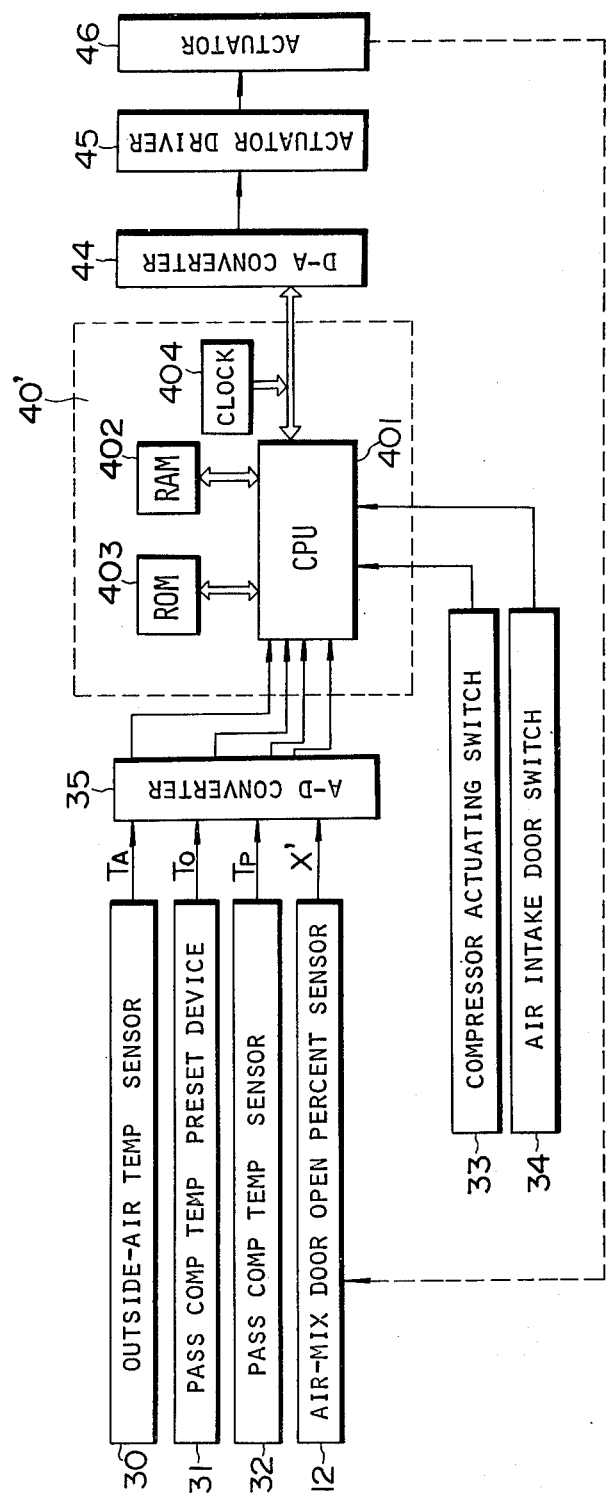
FIG. 3(B) is a schematic block diagram of a second embodiment of the air conditioning system according to the present invention.
Figure 4:
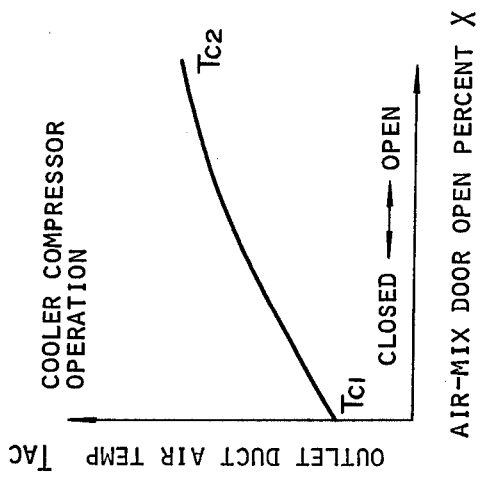
FIG. 4(A) is a graphical representation of relationship between outlet duct air temperature and air mix door opening percentage in outside-air introduction mode.
FIG. 4(B) is a graphical representation of relationship between outlet duct air temperature and air mix door opening percentage in inside-air recirculation mode.
FIG. 4(C) is a graphical representation of relationship between outlet duct air temperature and air mix door opening percentage in cooler compressor operation mode.
Figure 4:
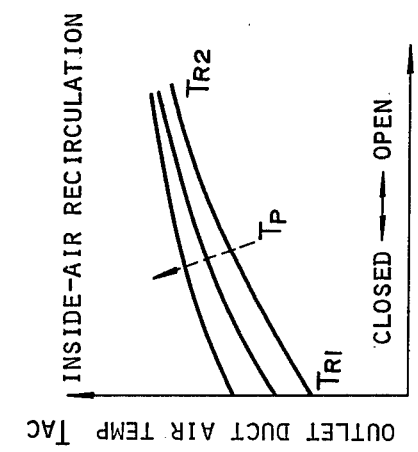
Figure 4:
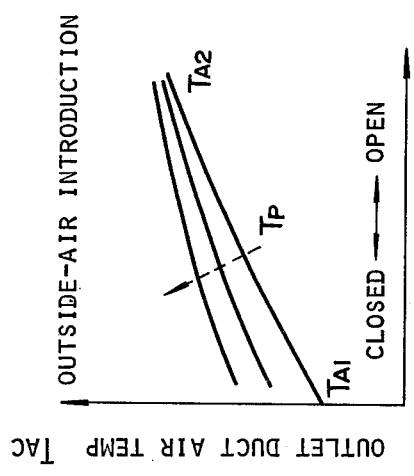
Figure 5:
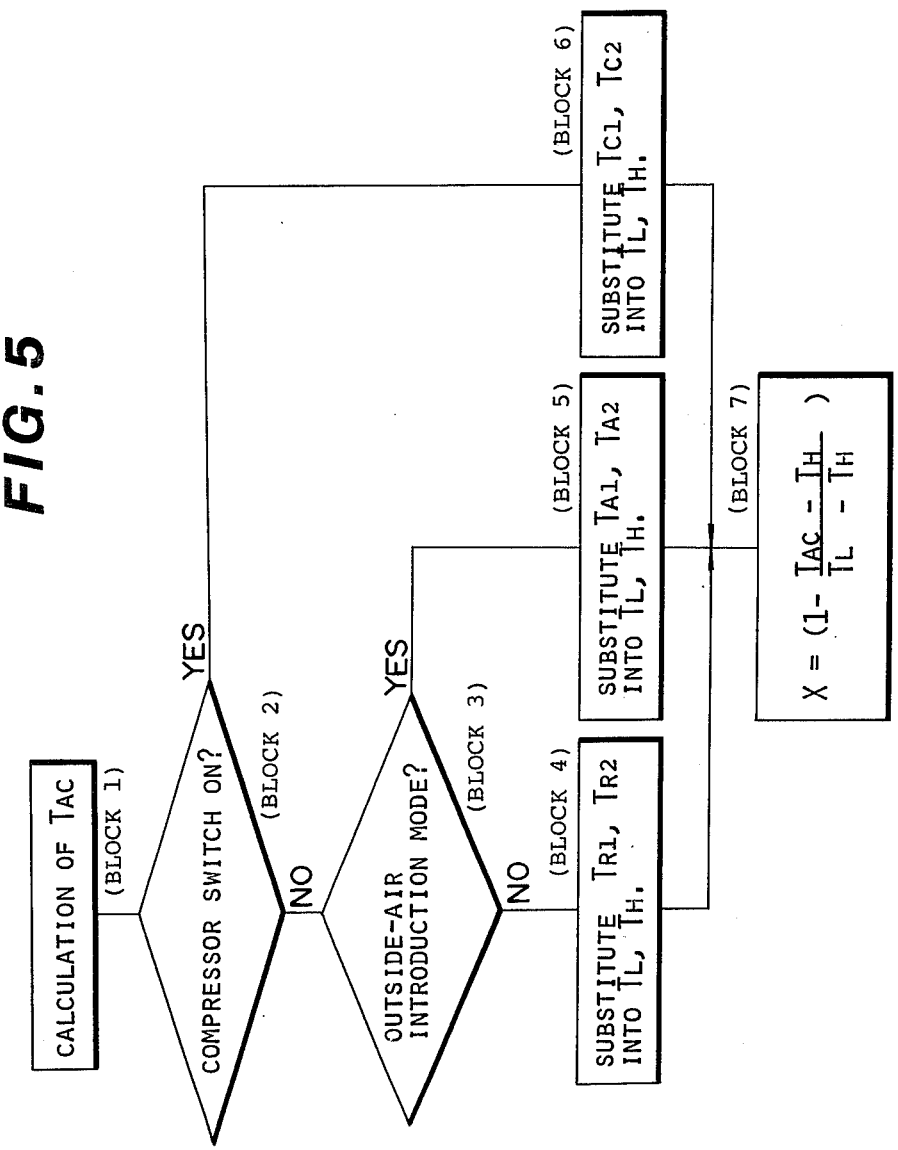
FIG. 5 is a flowchart showing the calculation of air mix door opening percentage.

In view of the above description, reference is now made to FIGS. 3–5, and more specifically to FIG. 3(A).

FIG. 3(A) shows a schematic block diagram of a first embodiment of an air conditioning system according to the present invention. In the figure, the reference numeral 30 denotes an outside-air temperature sensor outputting a signal $T_A$, the numeral 31 denotes a passenger compartment air temperature presetting device outputting a signal $T_O$, the numeral 32 denotes a passenger compartment air temperature sensor outputting a signal $T_P$, and the numeral 33 denotes cooler compressor actuating switch. When this cooler compressor actuating switch is turned on, a compressor of the cooling unit is actuated and the evaporator consequently begins to operate. The reference numeral 34 denotes an air intake door switch detecting whether the air intake duct is in outside-air introduction mode (A) or inside-air recirculation mode (B) according to the motion of the inside- and outside-air switching door 16 of FIG. 1. The reference numeral 12 denotes an air mix door opening percentage sensor for detecting the opening percentage of the air mix door of FIG. 1 and outputting a signal $X'$ indicative thereof. The numeral 35 denotes an analog-digital converter to convert the outside-air temperature signal $T_A$, the passenger compartment air preset temperature signal $T_O$, the passenger compartment air temperature signal $T_P$, and the air mix door opening percentage signal $X'$ to corresponding digital signals.

The numeral 40 denotes an arithmetic control unit which includes a target outlet duct air temperature calculating unit 41 to calculate a target temperature $T_{AC}$ of air to be outputted from the outlet duct into the passenger compartment, an air mix door opening percentage calculating unit 42 to calculate the opening percentage X of the air mix door on the basis of the calculated target outlet duct air temperature, and a comparator 43 to compare the calculated air mix door opening percentage signal X from the calculating unit 42 with a digitized signal corresponding to the opening percentage signal $X'$ acutally detected by the air mix door opening percentage sensor 12. Further, in this embodiment, the target outlet duct air temperature calculating unit 41 is provided with a first memory unit 411 therewithin, and the air mix door opening percentage calculating unit 42 is provided with a second memory unit 421 therewithin.

The reference numeral 44 denotes a digital-analog converter for converting the digital signal outputted from the comparator into an analog signal, the numeral 45 denotes an actuator driver, such as the solenoid valves of FIG. 1, to output an actuator driving signal in response to the analog signal outputted from the D-A converter 44. The numeral 46 denotes an actuator which corresponds to the actuator 11 of FIG. 1 for adjusting the air mix door position in response to the actuator driver signal outputted from the actuator driver 45. Now follows a description of the operation of the air conditioning system thus constructed.

When a signal indicative of a preset passenger compartment air temperature $T_O$ preset by the passenger compartment temperature presetting device 31, a signal indicative of an outside-air temperature $T_A$ detected by the outside-air temperature sensor 30, and a signal indicative of passenger compartment air temperature $T_P$ detected by the passenger compartment air temperature sensor 32 are inputted to the target outlet duct air temperature calculating unit 41 including the first memory unit 411, the calculating unit 41 calculates a target outlet duct air temperature $T_{AC}$ on the basis of the above-mentioned three signals $T_O$, $T_A$, and $T_P$ in accordance with a heat equilibrium equation (6):

$$T_{AC} = aT_O + bT_A + cT_S + d + \alpha(T_O - T_P)$$

In this embodiment, the constants a, b, c, d, and $\alpha$ and the passenger compartment air temperature increase $T_S$ due to solar heat are all previously stored in the first memory 411 of the target outlet duct air temperature calculating unit 41.

A signal $T_{AC}$ indicative of the calculated outlet duct air temperature is outputted therefrom and inputted to the air mix door opening percentage calculating unit 42.

When the signal $T_{AC}$ is inputted to the air mix door opening percentage calculating unit 42 including therein the second memory unit 421, the calculating unit 42 calculates an air mix door opening percentage X according to the calculated target outlet duct air temperature $T_{AC}$ in accordance with a proportion expression explained hereinafter in more detail. In this case, an outlet duct air temperature $T_H$ when the air mix door is fully open and an outlet duct air temperature $T_L$ when the air mix door is fully closed are used in conjunction with the target outlet duct air temperature $T_{AC}$. The above-mentioned fully-open air temperature $T_H$ and fully-closed air temperature $T_L$ are obtained from the three characteristic curves representative of relationships between outlet duct air temperature $T_{AC}$ and air mix door opening percentage X, which correspond to the respective air introduction modes of outside-air introduction mode, inside-air recirculation mode, and cooler compressor operation mode, and are previously stored into a second memory unit 421 in the air mix door opening percentage calculating unit 42.

FIG. 4(A) shows the first relationships between outlet duct air temperature $T_{AC}$ and air mix door opening percentage X in outside air introduction mode, the characteristics of which change in the direction of the arrow when passenger compartment air temperature $T_P$ detected by the passenger compartment air sensor 32 increases, that is, which vary with passenger compartment air temperature $T_P$ as a parameter. The figure labels the outlet duct air temperature $T_L$ when the air mix door is fully closed as $T_{A1}$ and the outlet duct air temperature $T_H$ when the air mix door is fully open as $T_{A2}$.

FIG. 4(B) shows the analogous characteristics in inside-air recirculation mode, the characteristics of which also vary in the direction of the arrow with passenger compartment air temperature detected by the passenger compartment air sensor 32 as a parameter. The figure labels $T_L$ as $T_{R1}$ and $T_H$ as $T_{R2}$.

FIG. 4(C) shows the analogous characteristics in cooler compressor operation mode, the characteristics of which, in this case, do not vary with respect to passenger compartment air temperature. The figure labels $T_L$ as $T_{C1}$ and $T_H$ as $T_{C2}$.

The above three characteristics are selected, respectively, when a signal, indicative of whether the cooler compressor is or is not in operation is inputted from the cooler compressor actuating switch 33 to the air mix door opening percentage calculating unit 42 and when a signal indicative of whether the air introduction mode is in outside-air introduction mode or in inside-air recirculation mode is inputted from the air intake door switch 34 to the air mix door opening percentage calculating unit 42.

The characteristic curves of FIGS. 4A, 4B, and 4C can be stored in their entirety in the memory 421. In this case, opening percentage X can be retrieved directly from the memory 421 by the calculating unit 42 by comparing the values $T_{AC}$ and $T_P$ and the air introduction condition with the stored curves. However, this method requires a relatively large memory 421. Memory requirements can be reduced greatly by assuming the curves of FIG. 4 to be linear, and deriving the opening percentage X using the end points $T_L$ and $T_H$, which can be retrieved from the memory 421. In this case after the target outlet duct air temperature $T_{AC}$ has been calculated by the target outlet duct air temperature calculating unit 41, the opening percentage of the air mix door can be calculated in the air mix door opening percentage calculating unit in accordance with the following proportion expression.

$$X = \left(1 - \frac{T_{AC} - T_H}{T_L - T_H}\right) \times 100\% \quad (7)$$

where $T_H$ is the outlet duct air temperature when the air mix door is fully open, $T_L$ is the outlet duct air temperature when the air mix door is fully closed. This method is illustrated in FIG. 5. First, a decision is made whether or not the cooler compressor actuating switch 33 is turned on (Block 2). If on, an opening percentage X is determined by substituting $T_{C1}$ and $T_{C2}$ obtained from the characteristics of FIG. 4(C) into $T_L$ and $T_H$ of the above equation (7) (Block 6). If off, a decision is made whether or not the air conditioner is in the outside-air introduction mode depending upon the on-off state of the air intake door switch 34 (Block 3). If in outside-air introduction mode, the opening percentage X is determined by substituting $T_{A1}$ and $T_{A2}$ obtained from the characteristics of FIG. 4(A) into $T_L$ and $T_H$ of the above equation (7) (Block 5); if not in outside-air introduction mode, that is, if in inside-air recirculation mode, the opening percentage X is determined by substituting $T_{R1}$ and $T_{R2}$ obtained from the characteristics of FIG. 4(B) into $T_L$ and $T_H$ of the above equation (7) (Block 4). In this method, only the endpoints $T_L$ and $T_H$ of each of the characteristic curves need be stored in memory.

After the above-mentioned calculation has been completed in accordance with the proportion expression, the calculated air mix door opening percentage opening percentage X is compared with the digitized signal corresponding to the air mix door opening percentage signal X' detected by the air mix door opening percentage sensor 12 by the comparator 43. If the opening percentage do not coincide, a drive signal is outputted to the actuator driver 45 to operate the actuator 46 after being converted to analog signals through the D-A converter 44. In reality, the actuator driver 45 is a device such as two solenoid valves 14 and 15 of FIG. 1. The actuator 46 adjusts the opening percentage of the air mix door 5.

The calculating units 41 and 42 may be fabricated using discrete components in accordance with the equations set forth and the flowchart of FIG. 5. A programmable digital computer may also be utilized as set forth below.

FIG. 3(B) is a schematic block diagram of a second embodiment of the air conditioning system according to the present invention, in which a microcomputer is used as a specific implementation of the arithmetical control unit 40 of FIG. 3(A).

In the figure, the numeral 40' denotes an arithmetical control unit of a microcomputer having a central processing unit (CPU) 401 to execute various arithmetic operations in accordance with programs, a read only memory (ROM) 402 in which to store necessary programs, and a random access memory (RAM) 403 in which various calculated results are stored during execution of necessary arithmetical operations and a clock signal generator 404 which provides a high-frequency clock pulse signal for timing.

In the same manner as in FIG. 3(A), a signal $T_O$ indicative of the temperature preset by the passenger compartment air temperature presetting device 31, a signal $T_A$ indicative of the outside-air temperature detected by the outside-air temperature sensor 30, a signal $T_P$ indicative of the passenger compartment air temperature detected by the passenger compartment air temperature sensor 32, and a signal $X'$ indicative of the air mix door opening percentage detected by the air mix door opening percentage sensor 12 are all inputted to the CPU after having been converted by the A-D converter 35 from analog signals to the corresponding digital signals.

On the other hand, a signal indicative of whether the cooler compressor is in operation or not is directly inputted from the cooler compressor actuating switch 33 to the CPU 401, and a signal indicative of whether the air introduction mode is in outside-air introduction mode or in inside-air recirculation mode is also directly inputted from the air intake door switch 34 to the CPU 401.

The CPU 401 calculates a target outlet duct air temperature $T_{AC}$ on the basis of the passenger compartment temperature $T_O$ preset by the passenger compartment air temperature presetting device 31, the outside-air temperature $T_A$ detected by the outside-air temperature sensor 30, the passenger compartment air temperature $T_P$ detected by the passenger compartment air temperature sensor 32, and the increase in passenger compartment air temperature $T_S$ due to solar heat previously stored in the ROM 403 in accordance with the already-explained predetermined heat equilibrium equation (6) also stored in the ROM 403. Further, the CPU 401 calculates an air mix door opening percentage X by substituting into the already explained proportion expression (7) the calculated target outlet duct air temperature $T_{AC}$, the outlet duct air temperature $T_H$ when the air mix door is fully open and the outlet duct air temperature $T_L$ when the air mix door is fully closed, which are derived from the characteristic curves representative of relationships between outlet duct air temperature $T_{AC}$ and air mix door opening percentage X in the respective air introduction modes of outside-air introduction mode, inside-air recirculation mode and cooler compressor operation mode. The above-mentioned three characteristic curves are all previously stored in the ROM 403.

The calculated air mix door opening percentage X is compared with an air mix door opening percentage X' detected by the air mix door sensor 12 by the comparator 44. And, if the opening percentage do not coincide, a drive signal is outputted to the actuator driver 45 to operate the actuator 46 after being converted to analog signals through the D-A converter 44, so that the air mix door opening percentage can be adjusted.

It may readily be appreciated that the flowchart shown in FIG. 4 may be utilized to describe the program operation of the CPU 401, and the appropriate program to carry out the flowchart and mathematical operations may be stored in ROM 403. Further, digitized point values of the characteristics shown in FIGS. 4A, 4B and 4C may be stored in ROM 403 to obtain the desired data by a table look-up method.

As described above, in the air conditioning system according to the present invention, since a target outlet duct air temperature is calculated on the basis of preset passenger compartment air temperature, the detected outside-air temperature, and the detected passenger compartment air temperature in accordance with a previously-stored heat equilibrium equation, since the air mix door opening percentage according to the calculated target outlet duct air temperature is calculated in accordance with a previously-stored proportion expression and three characteristic curves of relationships between the outlet duct air temperature and air mix door opening percentage corresponding to the respective air introduction conditions, and since the air mix door opening percentage thus calculated is compared with the actually-detected air mix door opening percentage in order to control the air mix door opening percentage, it is possible to control the temperature of air outputted from the air conditioning system outlet duct into the passenger compartment at a constant level with a small time constant of temperature recovery, even if air introduced into the air conditioning system changes, in each of the outside-air introduction mode, the inside-air recirculation mode, and the cooler compressor operation mode.

It will be understood by those skilled in the art that foregoing description is in terms of preferred embodiments of the present invention wherein various changes and modifications may be made without departing from the spirit and scope of the invention, as set forth in the appended claims.

What is claimed is:

1. An air conditioning method for an automotive vehicle air conditioning system in which the temperature of air outputted into a passenger compartment is controlled by the opening percentage of an air mix door, which comprises the following steps of:
   (a) detecting air temperature at a plurality of locations, including at least outside air temperature $T_A$ and passenger compartment air temperature $T_p$;
   (b) determining a desired passenger compartment air temperature $T_O$ preset by a passenger compartment air temperature preset device;
   (c) calculating a required target outlet duct air temperature $T_{AC}$ as a function of outside air temperature $T_A$, passenger compartment air temperature $T_p$ and desired passenger compartment air temperature $T_O$ using a predetermined equation;
   (d) determining an air introduction condition selected by the passenger;
   (e) calculating an air mix door opening percentage required to produce outlet duct air at temperature $T_{AC}$ from one of a plurality of stored characteristic curves involving a predetermined relationship: of outlet duct air temperature $T_{AC}$, passenger compartment air temperature $T_p$ and air introduction condition, to air mix door opening percentage X; said characteristic curves being stored as a pair of endpoint values $T_L$ and $T_H$ representing extreme values of outlet duct air temperature $T_{AC}$ for the corresponding passenger compartment $T_p$ and air introduction condition, the calculating step being performed by linearly interpolating the target outlet duct air temperature $T_{AC}$ with respect to the endpoint values $T_L$ and $T_H$; and (f) positioning the air mix door in accordance with the calculated value of X.

2. An air conditioning method for an automotive vehicle air conditioning system in which the temperature of air outputted into a passenger compartment is controlled by the opening percentage of an air mix door as set forth in claim 1, wherein the predetermined equation to calculate the required target outlet duct air temperature $T_{AC}$ is $$T_{AC}=T_{ACO}+\Delta T,$$

where $$T_{ACO}=AT_O+bT_A+cT_S+d$$

and $$\Delta T=a(T_o-T_p),$$

$$\alpha=-a$$

and $T_{ACO}$ is the basic outlet duct air temperature, $\Delta T$ is the outlet duct air temperature correction, $T_O$ is the preset passenger compartment air temperature, $T_A$ is the detected outside-air temperature, $T_S$ is the increase in passenger compartment air temperature due to solar heat, $T_p$ is the detected passenger compartment air temperature, and a, b, c, and d are constants.

3. An air conditioning method for an automotive vehicle air conditioning system in which the temperature of air outputted into a passenger compartment is controlled by the opening percentage of an air mix door as set forth in claim 1, wherein the step of calculating an air mix door opening percentage X comprises the following steps of:

(a) storing said plurality of characteristic curves indicative of relationships between outlet duct air temperature $T_{AC}$, and air mix door opening percentage X with passenger compartment air temperature $T_p$ as a parameter, the characteristic curves being stored corresponding to each air introduction condition;

(b) selecting one of the stored characteristic curves corresponding to the determined air introduction condition, in response to the detected passenger compartment air temperature $T_p$;

(c) retrieving the values of a first endpoint outlet duct air temperature $T_L$ obtained when the air mix door is fully closed and a second endpoint outlet duct air temperature $T_H$ obtained when the air mix door is fully open from the selected characteristic curve; and (d) calculating the air mix door opening percentage X from the values of the current calculated outlet duct air temperature $T_{AC}$, and in accordance with the linear interpolation between the retrieved first and second endpoint outlet duct air temperatures $T_L$ and $T_H$ according to the following equation:

$$X=(1-[T_{AC}-T_H]/[T_L-T_H])\times 100\%.$$

4. An air conditioning method for an automotive vehicle air conditioning system in which the temperature of air outputted into a passenger compartment is controlled by the opening percentage of an air mix door as set forth in claim 1, wherein the air introduction condition can be any of the three following conditions:

(1) cooler compressor operation mode in which a compressor within the air conditioning system operates to cool air introduced thereinto, the step of calculating the air mix door opening percentage X according to the characteristic curve corresponding to this mode being not dependent upon the value of passenger compartment air temperature $T_p$;

(2) outside air-introduction mode in which the compressor is not operating and air is introduced into the air conditioning system only from outside the vehicle, the step of calculating the air mix door opening percentage X according to the characteristic curves corresponding to this mode being dependent upon the value of passenger compartment air temperature $T_p$; and (3) inside-air recirculation mode in which the compressor is not operating and air is introduced into the air conditioner only from inside the passenger compartment, the step of calculating the air mix door opening percentage X according to the characteristic curve corresponding to this mode being dependent upon the value of passenger compartment air temperature $T_p$.

5. An air-conditioning system for an automotive vehicle in which the temperature of air outputted from an air conditioner outlet duct into a passenger compartment is controlled by adjusting an air mix door, which comprises:

(a) a passenger compartment air temperature presetting device;

(b) an outside-air temperature sensor;

(c) a passenger compartment air temperature sensor;

(d) an air mix door opening percentage sensor for detecting the opening percentage of the air mix door;

(e) a cooler compressor actuating switch for detecting whether a cooler compressor is in operation or not;

(f) an air intake door switch for detecting whether air outputted from the air outlet duct into the passenger compartment is introduced from the outside or recirculated within the passenger compartment;

(g) a target outlet duct air temperature calculating means for calculating a target outlet duct air temperature $T_{AC}$ on the basis of the passenger compartment temperature $T_O$ preset by said passenger compartment air temperature presetting device, the outside-air temperature $T_A$ detected by said outside-air temperature sensor, and the passenger compartment air temperature $T_P$ detected by said passenger compartment air temperature sensor;

(h) an air mix door opening percentage calculating means for calculating an air mix door opening percentage X by substituting into a proportion expression the calculated target outlet duct air temperature $T_{AC}$ obtained by said target outlet duct air temperature calculating means, an outlet duct air temperature $T_H$ when the air mix door is fully open at a detected passenger compartment air temperature $T_P$, and an outlet duct air temperature $T_L$ when the air mix door is fully closed at the detected air temperature $T_P$, the outlet duct air temperatures $T_H$ and $T_L$ being obtained, respectively, in accordance with first characteristic curves representative of first relationships between outlet duct air temperature $T_{AC}$ and air mix door opening percentage X varying with respect to the detected passenger compartment air temperature $T_P$ detected by said passenger compartment air temperature sensor in the case when said cooler compressor actuating switch detects that the cooler compressor is not in operation and said air intake door switch detects that air outputted from the air outlet duct into the passenger compartment is introduced from the outside, second characteristic curves representative of second relationships between outlet duct air temperature $T_{AC}$ and air mix door opening percentage X varying with respect to the detected passenger compartment air temperature $T_P$ detected by said passenger compartment air temperature sensor in the case when said cooler compressor actuating switch detects that the cooler compressor is not in operation and said air intake door switch detects that air outputted from the air outlet duct into the passenger compartment is recirculated from within the passenger compartment, and a third characteristic curve representative of a third relationship between outlet duct air temperature $T_{AC}$ and air mix door opening percentage X independent of the detected passenger compartment air temperature $T_p$ in the case when cooler compressor actuating switch detects that the cooler compressor is in operation;

(i) a comparator for comparing the calculated air mix door opening percentage X obtained by said air mix door opening percentage calculating means with an air mix door opening percentage X' detected by said air mix door opening percentage sensor;

(j) an air mix door actuator driver responsive to said comparator for outputting an air mix door actuating signal when the calculated air mix door opening percentage X is not equal to the detected air mix door opening percentage X'; and (k) an air mix door actuator for positioning the air mix door in response to the signal outputted from said air mix door actuator driver, whereby the outlet duct air temperature is controlled at a constant level with a small time constant of recovery in an outside-air introduction mode, an inside-air recirculation mode, and a cooler compressor operation mode, respectively.

6. An air-conditioning system for an automotive vehicle in which the temperature of air outputted from an air conditioner outlet duct into a passenger compartment is controlled by adjusting an air mix door, which comprises:

(a) a passenger compartment air temperature presetting device;

(b) an outside-air temperature sensor;

(c) a passenger compartment air temperature sensor;

(d) an air mix door opening percentage sensor for detecting the opening percentage of the air mix door;

(e) a cooler compressor actuating switch for detecting whether a cooler compressor is in operation or not;

(f) an air intake door switch for detecting whether air outputted from the air outlet duct into the passenger compartment is introduced from the outside or recirculated from within the passenger compartment;

(g) a microcomputer which includes:
  (1) a central processing unit for executing various arithmetic operations in accordance with programs;
  (2) a read-only memory for storing said programs thereinto;
  (3) a random-access memory for storing calculated results produced by said central processing unit in accordance with the program stored in said read-only memory during execution of arithmetic operations;
  (4) a clock signal generator for providing a high-frequency clock timing pulse signal, said central processing unit first calculating a target outlet duct air temperature $T_{AC}$ on the basis of the passenger compartment temperature $T_O$ preset by said passenger compartment air temperature presetting device, the outside-air temperature $T_A$ detected by said outside-air temperature sensor, and the passenger compartment air temperature $T_P$ detected by said passenger compartment air temperature sensor, in accordance with a predetermined heat equilibrium equation also stored in said read-only memory provided with said microcomputer;

and next calculating an air mix door opening percentage X by substituting into a proportion expression stored in said read-only memory the calculated target outlet duct air temperature $T_{AC}$ obtained by said central processing unit, an outlet duct air temperature $T_H$ when the air mix door is fully open at a detected passenger compartment air temperature $T_P$, and an outlet duct air temperature $T_L$ when the air mix door is fully closed at the detected air temperature $T_P$, the outlet duct air temperature $T_H$ and $T_L$ being obtained, respectively, in accordance with first characteristic curves representative of first relationships between outlet duct air temperature $T_{AC}$ and air mix door opening percentage X, varying with respect to the detected passenger compartment air temperature $T_P$ detected by said passenger compartment air temperature sensor, in the case when said cooler compressor actuating switch detects that the cooler compressor is not in operation and said air intake door switch detects that air outputted from the air outlet duct into the passenger compartment is introduced from the outside, second characteristic curves representative of second relationships between outlet duct air temperature $T_{AC}$ and air mix door opening percentage X, varying with respect to the detected passenger compartment air temperature $T_P$ detected by said passenger compartment air temperature sensor, in the case when said cooler compressor actuating switch detects that the cooler compressor is not in operation and said air intake door switch detects that air outputted from the air outlet duct into the passenger compartment is recirculated from within the passenger compartment, and a third characteristic curve representative of a third relationship between outlet duct air temperature $T_{AC}$ and air mix door opening percentage independent of the detected passenger compartment air temperature $T_p$ in the case when cooler compressor actuating switch detects that the cooler compressor is in operation, the above first, second, and third characteristics being stored in said read-only memory provided within said microcomputer;

(h) said control processing unit comparing the calculated air mix door opening percentage X obtained by said said central processing unit with the air mix door opening percentage X' detected by said air mix door opening percentage sensor;

(i) an air mix door actuator driver responsive to said microcomputer for outputting an air mix door actuating signal when the calculated air mix door opening percentage X is not equal to the detected air mix door opening percentage X'; and (j) an air mix door actuator for positioning the air mix door in response to the signal outputted from said air mix door actuator driver, whereby the outlet duct air temperature is controlled at a constant level with a small time constant of recovery in an outside-air introduction mode, an inside-air recirculation mode, and a cooler compressor operation mode, respectively.

7. An air-conditioning system for an automotive vehicle in which the temperature of air outputted from an air conditioner outlet duct into a passenger compartment is controlled by adjusting an air mix door as set forth in claim 5, wherein said passenger compartment air temperature presetting device, said outside air temperature sensor, said passenger compartment air temperature sensor and said air mix door opening percentage sensor generate analog signals and said system further comprises:

(a) an A-D converter for converting the analog signals from said passenger compartment air temperature presetting device, said outside-air temperature sensor, said passenger compartment air temperature sensor, and said air mix door opening percentage sensor, respectively, into corresponding digital signals; and (b) a D-A converter for converting a digital signal outputted from said comparator into an analog signal, the converted analog signal being inputted to said actuator driver.

8. An air conditioning system for an automotive vehicle in which the temperature of air outputted from an air conditioner outlet duct into a passenger compartment is controlled by adjusting an air mix door as set forth in either claim 5 or 6, wherein said actuator driver comprises:

(a) a first solenoid valve for introducing vacuum pressure from an engine intake manifold into said actuator in order to adjust the air mix door opening percentage; and (b) a second solenoid valve for releasing the pressure of said actuator in order to adjust the air mix door opening percentage.

9. An air-conditioning system for an automotive vehicle comprising:

(1) a cooling unit (2) a heating unit (3) air conduit means for feeding air from an intake duct to an outlet duct and into a passenger compartment of the vehicle, (4) an air mix door (5) said cooling unit operative to cool air passing from said intake duct to said outlet duct, (6) said heating unit operative for heating air passing from said intake duct to said outlet duct in proportion to the amount of opening of said air mix door, (7) an air intake door operative in a fresh air position for opening said intake duct to air outside said passenger compartment and operative in a recirculating air position for opening said air intake duct to air inside said passenger compartment, (8) a passenger compartment air temperature presetting device operative for generating a first signal;

(9) an outside-air temperature sensor operative for generating a second signal;

(10) a passenger compartment air temperature sensor operative for generating a third signal;

(11) an air mix door opening sensor for detecting the amount of opening of the air mix door and for generating a fourth signal corresponding thereto;

(12) a cooling unit actuating switch for detecting whether said cooling unit is in operation and for generating a fifth signal corresponding thereto;

(13) an air intake door switch for detecting the position of said air intake door and generating a sixth signal corresponding thereto;

(14) a microcomputer connected to receive digital signals corresponding to said first-sixth signals and including:

(a) a central processing unit for executing programs;

(b) a read-only memory for storing said programs; and (c) a random-access memory for storing results produced by said central processing unit in accordance with the programs stored in said read-only memory;

said central processing unit operative in response to said stored programs and said first-third digital signals for calculating a target outlet duct air temperature $T_{AC}$ on the basis of a predetermined function involving a passenger compartment temperature $T_O$ corresponding to said first signal and preset by said passenger compartment air temperature presetting device, the outside-air temperature $T_A$ corresponding to said second signal and the passenger compartment air temperature $T_p$ corresponding to said third signal, and for further calculating an air mix door opening amount X required to produce outlet duct air at temperature $T_{AC}$ from one of a plurality of stored characteristic curves involving a predetermined relationship of outlet duct air temperature $T_{AC}$, passenger compartment air temperature $T_p$ and air introduction condition, determined in response to said fifth signal and said sixth signal, to air mix door opening amount X, said characteristic curves being stored in said read only memory as a pair of endpoint values $T_L$ and $T_H$ representing extreme values of outlet duct air temperature $T_{AC}$ under the corresponding passenger compartment temperature $T_p$ and air introduction condition, the calculating step being performed by linearly interpolating the target outlet duct air temperature $T_{AC}$ with respect to the endpoint values $T_L$ and $T_H$;

(15) said central processing unit operative for comparing the calculated air mix door opening amount X with the air mix door opening amount X' corresponding to said fourth signal, and generating a control signal if the amount X is different from X';

(16) an air mix door actuator driver responsive to said control signal for outputting an air mix door actuating signal; and

(17) an air mix door actuator for positioning the air mix door in response to the actuating signal outputted from said air mix door actuator driver, whereby the outlet duct air temperature is controlled by controlling said air mix door at a constant level with a small time constant of recovery in an outside-air introduction mode, an inside-air introduction mode, and a cooler compressor operation mode, respectively.

10. An air-conditioning system for an automotive vehicle comprising:
    (1) a cooling unit
    (2) a heating unit
    (3) air conduit means for feeding air from an intake duct to an outlet duct and into a passenger compartment of the vehicle,
    (4) an air mix door
    (5) said cooling unit operative to cool air passing from said intake duct to said outlet duct,
    (6) said heating unit operative for heating air passing from said intake duct to said outlet duct in proportion to the amount of opening of said air mix door,
    (7) an air intake door operative in a fresh air position for opening said intake duct to air outside said passenger compartment and operative in a recirculating air position for opening said air intake duct to air inside said passenger compartment,
    (8) a passenger compartment air temperature presetting device operative for generating a first signal;
    (9) an outside-air temperature sensor operative for generating a second signal;
    (10) a passenger compartment air temperature sensor operative for generating a third signal;
    (11) an air mix door opening sensor for detecting the amount of opening of the air mix door and for generating a fourth signal corresponding thereto;
    (12) a cooling unit actuating switch for detecting whether said cooling unit is in operation and for generating a fifth signal corresponding thereto;
    (13) an air intake door switch for detecting the position of said air intake door and generating a sixth signal corresponding thereto;
    (14) electronic signal processing means for calculating a target outlet duct air temperature to attain a passenger compartment temperature corresponding to said first signal, and a door control means responsive to said first-sixth signals for generating an air mix door opening amount control signal to control an opening amount of said air mix door,
    said door control means including a memory means for storing curves representing a relationship among outlet air duct temperature, air mix door opening percentage, and passenger compartment temperature,
    said door control means further including calculating means for calculating from said stored curves an air mix door opening amount for producing said target outlet duct air temperature by linearly interpolating said target outlet duct temperature between a pair of end point duct temperature values corresponding to fully closed and fully opened positions of said air mix door,
    to thereby control the temperature within said compartment; and
    (15) actuator means responsive to said calculated air mix door opening amount control signal and connected to said air mix door to control the amount of opening of said air mix door.

11. An air conditioning method for an automotive vehicle air conditioning system in which the temperature of air outputted into a passenger compartment is controlled by the opening percentage of an air mix door, which comprises the steps of:
    (a) detecting air temperature at a plurality of locations, including a at least outside air temperature $T_A$ and passenger compartment air temperature $T_p$;
    (b) determining a desired passenger compartment air temperature $T_O$ preset by a passenger compartment air temperature preset device;
    (c) calculating a required target outlet duct air temperature $T_{AC}$ as a function of outside air temperature $T_A$, passenger compartment air temperature $T_p$ and desired passenger compartment air temperature $T_O$ using a predetermined equation;
    (d) determining an air introduction condition selected by a passenger;
    (e) storing a plurality of characteristic curves indicative of relationships between outlet duct air temperature $T_{AC}$ and air mix door opening percentage X with passenger compartment air temperature $T_P$ as a parameter, the characteristic curves being stored corresponding to each air introduction condition;
    (f) selecting one of the stored characteristic curves corresponding to the determined air introduction condition, in response to the detected passenger compartment air temperature $T_P$;
    (g) retrieving from the selected curve the values of a first endpoint outlet duct air temperature $T_L$ representing data obtained when an air mix door is fully closed, and a second endpoint outlet duct air temperature $T_H$ obtained when the air mix door is fully open;
    (h) calculating an air mix door opening percentage X on the basis of the current calculated outlet duct air temperature $T_{AC}$ and in accordance with a linear interpolation between the retrieved first and second endpoint outlet duct air temperatures $T_L$ and $T_H$; and
    (i) positioning the air mix door in accordance with the calculated air mix door opening percentage X.

12. An air conditioning method for an automotive vehicle air conditioning system in which the temperature of air outputted into a passenger compartment is controlled by the opening percentage of an air mix door, which comprises the steps of:
    (a) detecting air temperature at a plurality of locations, including at least outside air temperature $T_A$ and passenger compartment air temperature $T_p$;
    (b) determining a desired passenger compartment air temperature $T_O$ preset by a passenger compartment air temperature preset device;
    (c) calculating a required target outlet duct air temperature $T_{AC}$ as a function of outside air temperature $T_A$, passenger compartment air temperature $T_p$ and desired passenger compartment air temperature $T_O$ using a predetermined equation;
    (d) determining an air introduction condition selected by the passenger;
    (e) calculating an air mix door opening percentage X required to produce outlet duct air at the temperature $T_{AC}$ by:
    storing only the endpoints of a plurality of characteristic curves corresponding to a predetermined relationship between the calculated target value of required duct temperature $T_{AC}$ together with the determined air introduction condition, and the air mix door opening percentage X, selecting one of said plurality of stored predetermined characteristic curves in response to the detected passenger compartment air temperature $T_p$ and the determined air introduction condition;

retrieving the values of a first endpoint of the selected curve identifying an outlet duct air temperature $T_L$ obtained when the air mix door is fully closed and a second endpoint of the selected curve, identifying an outlet duct air temperature $T_H$ obtained when the air mix door is fully open, and calculating the air mix door opening percentage X from the values of the current calculated outlet duct air temperature $T_{AC}$, and the retrieved values of said first and a second endpoint outlet duct air temperatures $T_L$ and $T_H$ according to the first equation:

$$X = (1 - [T_{AC} - T_H]/[T_L - T_H]) \times 100\%$$

(f) positioning the air mix door in accordance with the calculated value of X.

* * * * *